Patented Aug. 25, 1953

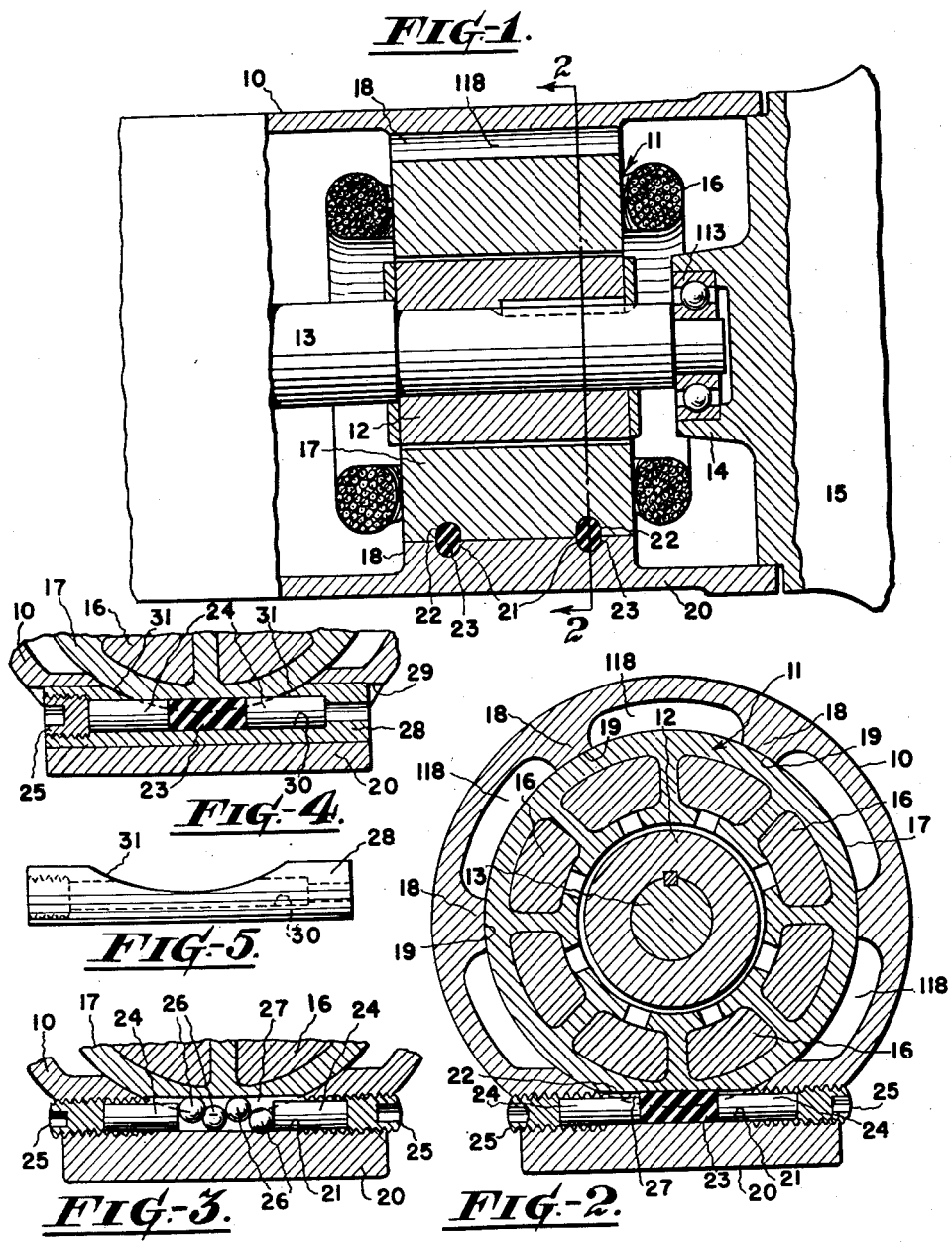

2,650,317

UNITED STATES PATENT OFFICE 2,650,317

CORE RETAINER FOR DYNAMOELECTRIC MACHINES

William R. Maclay and Emanuel G. Spyridakis, Athens, Pa., assignors to Ingersoll-Rand Company, New York, N. Y., a corporation of New Jersey Application April 12, 1949, Serial No. 86,988

2 Claims. (Cl. 310—258)

1

This invention relates to retainers and more particularly to retainers for a pair of telescopically arranged members—as for example, the stator and casing members of an electric motor.

Previously, members such as those given in the example were retained against relative movement with respect to each other by such means as screws threaded through the casing into the stator or by deforming the casing into a binding relation with the stator. These arrangements have several distinct disadvantages—as for example, the structural disadvantage associated with deforming the casing, or in the former arrangement, in small compact motors there is insufficient space for readily mounting the screws.

It is, accordingly, one object of this invention to retain or clamp a pair of telescopically arranged members against relative movement therebetween by exerting oppositely directed transverse forces against said members to move them in frictional engagement.

Another object of this invention is to provide a simple and effective means for exerting such force.

Other objects will become obvious from the following specification and accompanying drawing in which, Figure 1 is a longitudinal elevation, partly in section, of an electric motor provided with a preferred form of the retainer, Fig. 2 is a transverse view taken through Figure 1 along the line 2—2 looking in the direction of the arrows, Fig. 3 is a view, partly in section, of a modified form of the retainer, Fig. 4 is a view, partly in section, of a second modification of the retainer, and Fig. 5 is a view of the sleeve used in the second modification of the retainer.

Referring to the drawing, a preferred form of the retaining device is shown adapted, for the sake of example, to a small electric motor of the type used in hand drills and similar devices. In general, the retainer comprises means, such as the members 23 or 26, for converting a longitudinally directed force, with respect to the member, into a transverse force with respect to the motor, whereby the casing 10 and stator 11 of the motor are moved into engagement against relative movement with respect to each other. To this end, the said means is positioned between the stator and casing members in a notch or groove formed in and common to the adjacent opposed peripheries of the members, i. e., the inner periphery of the casing and the outer periphery of the stator. Thus, a longitudinal force exerted on said means is transmitted into oppositely directed transverse forces on the casing 10

2 and stator 11 whereby they are moved into and held in firm engagement with each other against relative movement therebetween.

More specifically, the motor aforesaid includes the casing 10 in which is mounted the stator or field structure 11 encircling the rotor 12 keyed to a shaft 13 supported by bearings 113, only one of which is shown. The bearing 113 shown is mounted in a bearing cup 14 integral with a body 15 enclosing the end of the casing 10.

In order to promote air cooling of the field structure 11 which includes a coil 16 and a core 17, longitudinally disposed ribs 18 are provided on the inner periphery of the casing 10 thereby forming air passages 118 between the casing 10 and the core 17. The inner end surfaces 19 of the ribs 18 are slightly curved in order to conform with the peripheral surface of the core 17 of generally circular or cylindrical form, as shown in Figure 2, and of slightly less diameter than the inner diameter of the casing 10, or the distance between diametrically opposed surfaces 19.

In accordance with the practice of the invention, the wall thickness of the casing 10 is at one portion increased somewhat to form the base 20 through which extends a pair of transverse passages 21. The central axes of the passages 21 are substantially tangential to the inner periphery of the casing 10. Thus, the intermediate portions of the passages 21 open into the interior of the casing 10 and are exposed to the outer periphery of the core 17 whenever it is properly positioned within the casing 10. The portions of the core 17 thus exposed to the passages 21 are cut away to form the notches 22 which conform with, or form a portion of, the passages 21. In other words, when the core 17 is properly aligned within the casing 10, a passage of substantially uniform cross section throughout its entire length is formed in the casing 10 and the core 17 by the cooperation of the passage 21 and the notch 22.

Positioned at intermediate portions of the passages 21 opposite the openings 27 in the passages 21 and opposite the notches 22 are distortional members 23 which, when compressed or otherwise distorted, engage the core 17 to force, or move, it into frictional engagement or contact with the surfaces 19 on the casing 10. In the present embodiment, the distortional members 23 are shown as being plugs of the same general cross sectional form as the passage 21 but of slightly less diameter to permit ease in inserting or removing the plug 23 from the passage 21. The plug 23 is shown as being made of rubber but it is to be understood that any similar type of material could be used effectively.

Positioned within the passage 21 at the opposite ends thereof is a means for distorting the plug 23 so as to force it into engagement with the inner member or core 17 in the manner aforesaid. Such means, in this instance, comprises a pair of rigid, or incompressible, cylindrical members, or pins, 24, one being positioned at each end of the plug 23 in the passage 21. And, in furtherance to this end, the opposite ends of the passage 21 are provided with threads for the reception of socket head screws 25 which force the pins 24 into engagement with the plug 23. In practice only one of the screws 25 is rotated to compress the plug 23, the other screw 25 and pin 24 serve merely as an abutment to prevent longitudinal movement of the plug 23 along the passage 30. In this manner, the longitudinal axis of the plug 23 is shortened and the transverse axis of the plug is, accordingly, increased. Thus, the plug 23 exerts in one direction a transverse force on the periphery of the core 17, and in the opposite direction a force is applied to the casing 10 thereby moving the core 17 into frictional engagement with the ribs 18 to firmly engage the core against movement relative to the casing 10. It is to be noted, further, that the diameter of the plug 23 in its uncompressed state is such that the plug 23 extends into the notch 22 to assure positive engagement between the members so engaged even though one of the screws 25 should back off and permit the distortional member to resume its natural shape.

In the alternate or modified form of the invention, shown in Figure 3, rigid members such as the balls 26 are used as means for engaging the core 17. The balls 26 are of substantially less diameter than the diameter of the passage 21 thus when the pins 24 are moved inwardly, the balls 26 are forced against each other and are thereby misaligned so that at least some of the balls are forced into the notch 22 to engage the core 17 and move it into frictional contact with the casing 10. The other, or remaining, balls 26 are, of course, forced into the opposite direction into contact with the lower portion of the passage formed in the casing 10 and exert a transverse force thereon in a direction opposite to the force exerted on the core 17.

In this form of the invention, as in the previously described form of the invention, the engaging means, here the balls 26, are of such diameter that they extend into the notch 22 when they are resting at the bottom of the passage 21 thus the core 17 is engaged to the casing 10 in a positive manner even though no force is applied to the opposite ends of the line of balls 26.

A second modification of the retainer is shown in Figures 4 and 5 in which a sleeve 28 is secured in a transverse passage 29 in the base 20, and the sleeve 28 defines a passage 30 in which are located the pins 24 and the plug 23. The sleeve 28 is cut away at its intermediate portion, as indicated by 31, thereby exposing the passage 30 to the notch 22. The passage 30 is similar also in location and other respects to the passage 21 with the exception that one end portion of the passage 30 is reduced to a diameter somewhat less than the diameter of the pin 24, this portion thereby acting as a stop, or abutment, for the pin 24. In this form of the invention, then, the pins 24 and the plug 23 are inserted in the passage 30 from one end thereof and a single screw 25 is provided for each passage for exerting a longitudinal force on the pin 24.

Whenever it is desired to disengage the stator 11 from the casing 12, the reduced portion of the passage 30 provides easy access to the pin 24 whereby the pin 24 and the plug 23 may be knocked clear of the passage 30 after the screw 25 is removed from the opposite end of the passage. By the provision of the replaceable sleeve 28, any wear or damage of the surface of the passage 30, caused for example by the imbedding of the balls 26 in the surface, or damage done to the threads provided in the passage 30 for the screw 25, does not necessitate reboring of the passage 21 and accordingly increasing, in order to obtain effective locking of the stator and casing, the size of the pins 24 and the plug 23 or the balls 26. It is merely necessary to replace the damaged sleeve 28 with a new sleeve 28.

From the foregoing description, it becomes clear that a retainer constructed in accordance with the practice of the invention accomplishes, among others, the previously said objects and is capable of engaging a pair of telescopically arranged members against relative movement therebetween in a simple yet highly effective manner.

While we have shown and described a specific form of our invention, it is to be understood that various changes and modifications may be made without departing from the spirit of the invention as set forth in the appended claims.

We claim:

1. A retainer for an electric motor having a stator slidable in a casing, comprising a transverse passage through the casing and having a portion exposed to said stator, a notch in the stator opposite said portion, balls of substantially smaller diameter than the diameter of said passage and positioned in the passage and extending into said notch, and means for forcing the balls against each other to move some of the balls into firm contact with the stator to force the stator into frictional engagement with the casing.

2. A retainer for a pair of telescopically arranged members, comprising a notch in the periphery of one of said members, a sleeve arranged transversely in the other said member and having an opening therein exposed to said notch, rigid means in the sleeve opposite the opening and extending into said notch for engaging said members against longitudinal movement therebetween, and means for forcing the first said means into said notch and into firm engagement with the notch and the surface of the sleeve for moving said members into engagement against relative movement therebetween.

WILLIAM R. MACLAY.
EMANUEL G. SPYRIDAKIS.

References Cited in the file of this patent

UNITED STATES PATENTS

| Number | Name | Date |
|---|---|---|
| 974,156 | Jones | Nov. 1, 1910 |
| 978,508 | Sutherland et al. | Dec. 13, 1910 |
| 1,934,415 | Fisher | Nov. 7, 1933 |
| 1,976,541 | Brown et al. | Oct. 9, 1934 |
| 2,162,359 | Rhinevault | June 13, 1939 |
| 2,226,897 | Cole | Dec. 31, 1940 |
| 2,478,551 | Turner | Aug. 9, 1949 |
| 2,483,032 | Baer | Sept. 27, 1949 |

FOREIGN PATENTS

| Number | Country | Date |
|---|---|---|
| 582,479 | Great Britain | Nov. 18, 1946 |